Nov. 10, 1953     F. H. STRADTMANN     2,658,712
GATE VALVE

Filed Aug. 18, 1949     4 Sheets-Sheet 2

Inventor:
FRIEDRICH HEINRICH STRADTMANN
BY Robert H. Jacob.
AGENT

Nov. 10, 1953  F. H. STRADTMANN  2,658,712
GATE VALVE
Filed Aug. 18, 1949  4 Sheets-Sheet 3

Inventor:
FRIEDRICH HEINRICH STRADTMANN
BY Robert H. Jacob
AGENT

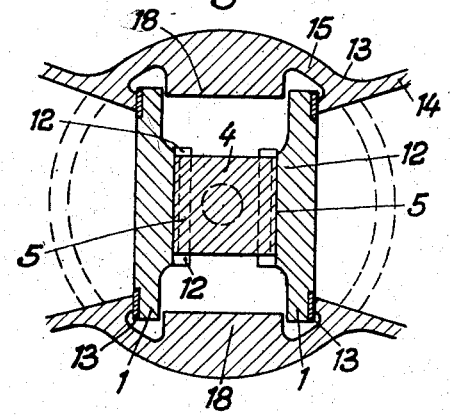
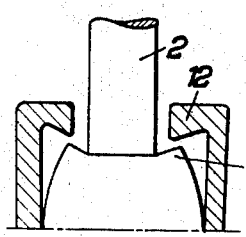
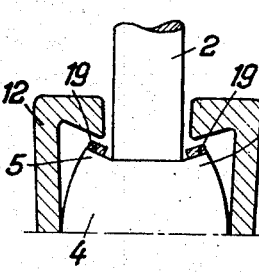
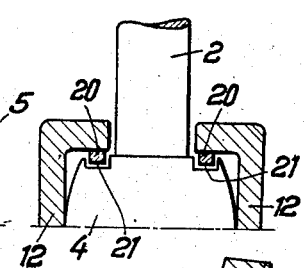
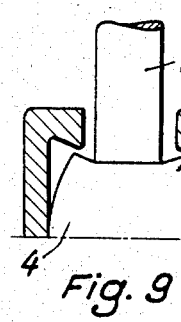
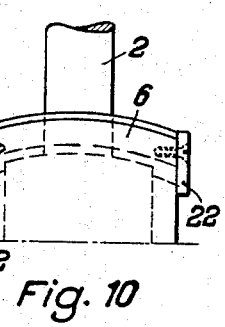
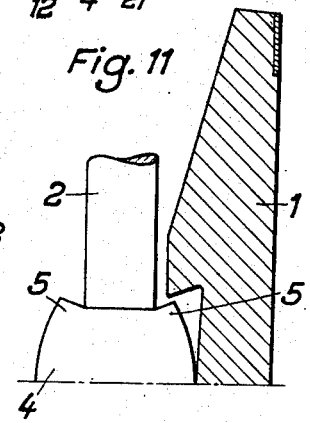

UNITED STATES PATENT OFFICE 2,658,712

GATE VALVE

Friedrich Heinrich Stradtmann, Dusseldorf, Germany

Application August 18, 1949, Serial No. 110,904

3 Claims. (Cl. 251—68)

Gate valves for gas, steam and liquid conduits are known in which the plates are arranged to be movable with respect to the valve stem in order to provide the possibility for the plates to adjust themselves in the closed valve position with their faces relative to the planes of the corresponding countersurfaces in the valve housing. For fastening these movable plates with respect to the valve stem and the guides of these plates relative to the valve housing these valve constructions in accordance with the prior art utilized so-called plate holders which, on the one hand are movably connected to the valve plates, and on the other hand are in engagement with the guiding means which are rigidly fastened to the valve housing. Gate valve constructions of that type, however, had the disadvantage that the plate holder was a part which was difficult to produce and difficult to work on, and which, in addition, was relatively sensitive to the disengagement forces which attend the opening of the gate valve. Furthermore, a special space was required for the plate holders which resulted in an increase of the over-all dimensions of the gate valve housing and consequently the expenditure of material and weight.

The invention relates to a gate valve with gate plates and has for its object to provide a valve having movable gate plates, the form of construction of which avoids the disadvantages of known gate valves and offers a simple and non-sensitive assembly. In accordance with the invention this can be achieved substantially in that the gate plates are connected to the valve stem loosely, yet adapted for limited movement. Thus, according to the invention a special plate holder is eliminated, and the purpose of such a plate holder in gate valve constructions of the prior art is achieved in accordance with the invention by the particular arrangement and construction of the gate plates.

In accordance with the invention two fundamental modes of execution of the basic principle are possible. The gate plates in a valve may either be loosely guided between the guiding means in the housing and the valve stem, or in accordance with another embodiment the valve stem proper may be constructed in such a manner that the gate plates are allowed only a limited amount of play.

Under all conditions the valve stem proper performs the function of a plate holder in the tightening and loosening of the valve plates. In the first case the guiding of the plates is achieved in that they are in direct engagement with the guiding means in the housing through projections and recesses. In the other embodiment they are directly connected with the stem in a manner that by virtue of this connection the valve plates are on the one hand afforded the necessary play with respect to the packing planes in the valve housing to assure of a complete engagement with the packing planes in the closed position and that on the other hand the force necessary for the opening and closing of the valve is transferred to the valve plates.

For example, a gate valve in accordance with the invention may be constructed in such a manner, that the gate plates which are in direct engagement with the guiding means in the housing through projections and recesses are movable with respect to the valve stem. Thus, with this type of valve construction the gate plates roll on the guiding means in the housing during tightening and loosening, that a constant change of the parts of the packing planes takes place. In this manner it is particularly avoided that owing to repeated closing and opening of the valve radial dents are formed as a result of slight unevenness which endanger the tightness of the valve. Such a form of construction is particularly advantageous for use in conduits where high pressures predominate.

More in particular, it is possible in accordance with the invention to provide the valve stem with a pressure body which engages the valve plates in the direction of the axis of the stem by means of shoulders or the like, which control the movement of the plates during closing and opening of the valve. The tightening of the valve plates on the packing plates in the end position takes place by means of curved engagement planes intermediate the pressure member and the valve plates. The torque caused by the stem nut during the loosening of the valve can thus be absorbed in a simple manner in that the stem is in engagement with the guiding means in the housing through a guiding tube or a special bridge.

In accordance with a further embodiment of the invention the pressure member arranged at the valve stem can be in engagement with the valve plates by means of projections or recesses and can, therefore, also perform the task of guiding the valve plates with a limited amount of play besides its normal functions. The projections and recesses may be formed in any manner desired, for example, they may be in the form of dove-tail guides, which may be provided at their ends with lateral stops, in order to prevent the valve plates from shifting side wise on the dove-tail guides beyond the permissible limits. The invention may also be realized with particular advantages in that the socket tube in which the valve stem is guided in the normal manner is fitted with such clearance relative to the diameter of the valve plates that the socket tube proper and the connecting portion of the valve housing below it constitutes a safeguard against lateral movements of the valve plates that exceed the permissible limits.

Fundamentally the concept of the invention may be applied to all types of gate valve constructions known heretofore. However, the invention may to greater advantage be more extensively adapted by making the valve housings out of tube sections by welding. Input and output stubs of the valve housing may, in that event, be advantageously formed from sections of normal tubes which may be given conical shape on a mandrel. In this manner the essential, and outstanding advantage is obtained that a valve construction of singularly light and reliable shape can be produced which is decidedly superior to the valves with steel cast housings known heretofore, particularly also with respect to the production costs and the rapid adaptability of the individual valve shape and size to the prevailing conditions.

Further advantageous particulars of the invention are shown in the drawings where the invention is explained for illustrative purposes, and where Fig. 1 shows a valve in accordance with the invention in cross section;

Fig. 5 shows a cross section along line V—V of Fig. 4, and

Figs. 6–11 explain further embodiments of the inveniton schematically.

Figure 1:
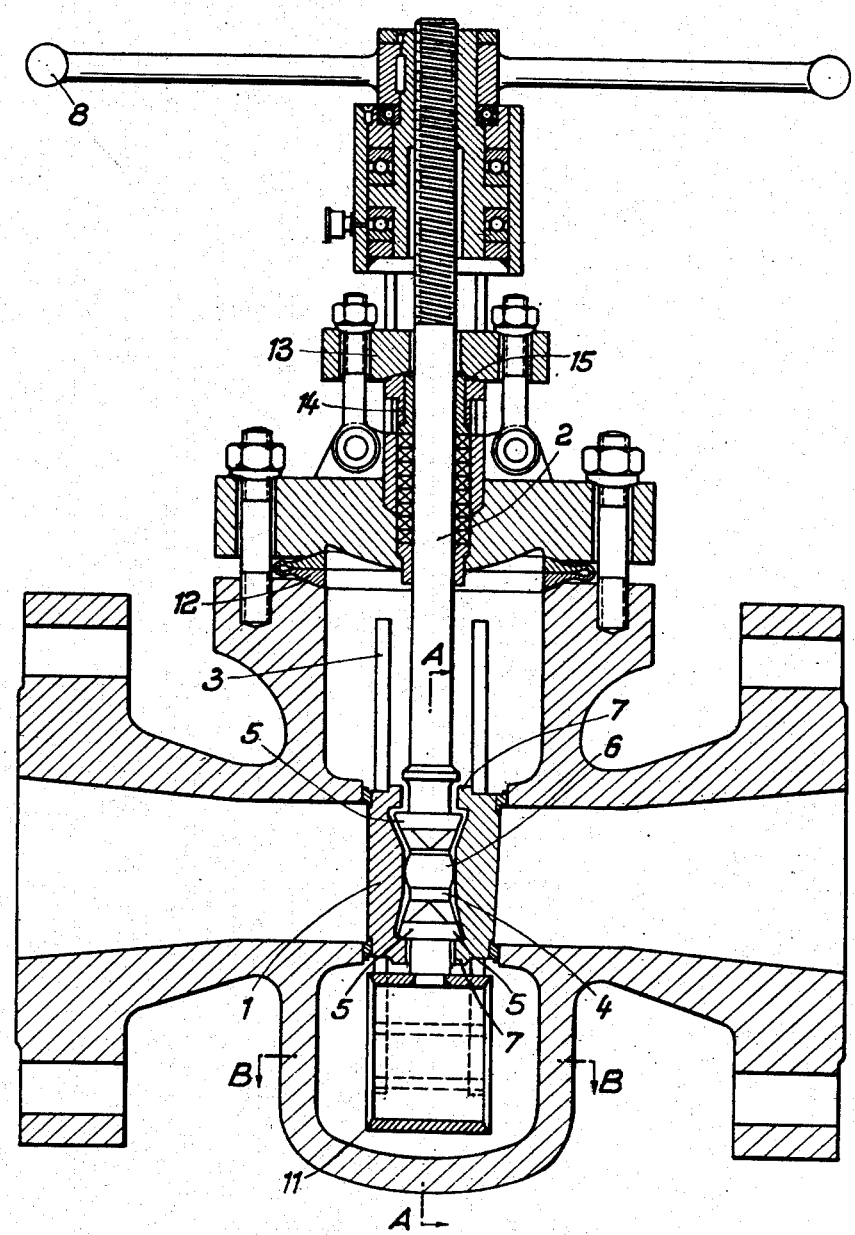
Figure 2:
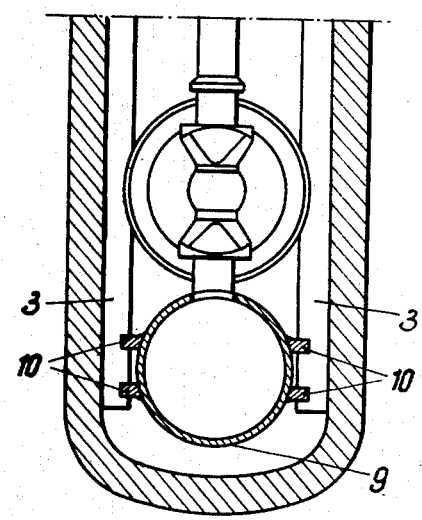
Fig. 2 shows a cross section along line A—A of Fig. 1.
Figure 3:
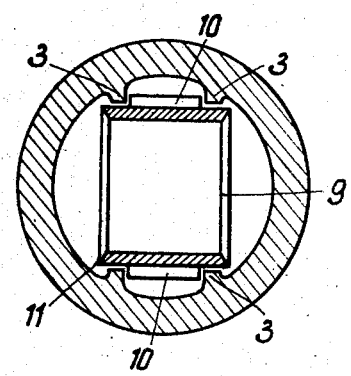
Fig. 3 shows a cross section along line B—B of Fig. 1.

In the embodiment illustrated in Figs. 1–3 the valve plates 1 are loosely supported between the stem 2 and the guide rails 3 which are arranged in the valve housing. The stem 2 is provided with a pressure member 4 in the region of the pressure plates which member engages the shoulders of the valve plates 1 in the direction of the axis of stem 2 while opening or closing the valve. The pressure member has a rounded plane 6 at its mid portion against which the pressure plates 1 rest. The plates 1 are in engagement with the guides 3 in the housing, for example, through projections 7 formed like flanges or by means of grooves in the circumference of the plates and may roll on the guides 3 during the insertion or retraction of the slide so that they perform a rotary movement. The guides 3 may be slightly inclined downwardly in the form of a wedge. Also the planes of the packing faces at the housing opposite plates 1 present a wedge shape. When closing the valve the plates 1 are drawn into this wedge shape through the lower shoulders 5 and are pressed against the packing planes by means of the rounded planes 6. In opening the valve by the operation of the hand wheel 8 the stem 2 is moved upwardly whereby the engagement of the lower shoulders 5 of the pressure member 4 and the pressure upon the rounded member 6 is relieved, and the plates are pulled upwardly as a result of the engagement of the upper shoulders 5. In this manner there first occurs a loosening of the plates and then a withdrawing of the same. The torque exerted during the operation of the hand wheel 8 in the opening direction upon the stem 6 may be absorbed, for example, if the connecting tube 9 is in engagement with the guides 3 through corresponding bars 10. Thus this torque is prevented from being transferred to valve plates 1. In structures where no connecting tube is employed the same effect can be obtained in that a cross over or a bridge is arranged at the lower end of stem 2 which is in engagement with the guides 3 in a corresponding manner.

The housing of the valve may consist of cast steel, as shown, or it may be formed by a welded steel tubing construction. The tightening of the flange of the housing is suitably achieved by a lens shaped gasket 12. As may be seen in the illustrative embodiment of Fig. 1, the binocular flange 13 engages the stuffing box 15 with a spherical plane whereby the essential advantage is obtained that for the tightening of the flange 13 and the tightening of the binoculars, only the two bolts shown in the drawing are required while simultaneously wedging of the flange is effectively prevented. In accordance with a further concept of the invention the front surfaces 13 of the connecting tube 9 are inclined inwardly whereby the essential advantage is obtained that the front edge of the connecting tube 9 does not constitute an obstruction for the flowing medium even if its position is not accurately obtained for covering the opening of the valve when the plates are turned up by means of stem 2. By this means the disturbing noise ordinarily resulting from inaccurate adjustment of the guide tube is avoided.

In the embodiments illustrated in Figs. 4–11 the shoulders or projections 5 provided on pressure members 4 formed upon the valve stem 2, for example, by upsetting, are shaped in such a manner that they form a type of dove-tail guide with respect to the valve plates 1, or with respect to suitably formed intermediate pieces 12, which are fastened to the valve plates 1, for example, by welding. The connection formed between valve stem 2 and the valve plates 1 by the projections 5 and the intermediate members 12 provides a sufficient play or tolerance for the valve plates 1 with respect to the valve housing so that the plates 1 are enabled to fully contact the packing surfaces 13 in the valve housing in the closed position shown. The projections 5, however, limit at the same time the movement of the valve plates 1 sidewise, as shown particularly in Fig. 6, and they prevent in particular that the valve plates fall off the stem 2 when the valve is opened and has been pulled upwardly from the closed position illustrated in Fig. 4. During opening and closing of the valve the projections 5 transfer the forces emanating from the valve stem 2 to the valve plates. In closing, the lower projections 5 of the enlargement 4 pull the pressure plates 1 into the wedge shaped spaces formed by the packing surfaces 13. Beyond that the tightening of the valve plates on the packing surface 13 in the direction of the axis of the intake and output stub 14 is achieved in that the enlargement 4 rests against the valve plates 1 with curved surfaces 6. When opening the valve the upper projections 5 exert forces upon the corresponding counterplanes of the intermediate pieces 12 and thus upon the valve plates 1 and cause that the valve plates 1 are at first lifted from the packing planes 13 and then are pulled upwardly from their closing position. Thus the force which is applied to the valve plates 1 during the upward movement of the stem 2 is not effective parallel to the axis of the stem 2, but depending on the inclination of the contact surfaces of the projection 5 and of the intermediate pieces 12, at an angle to the valve stem so that the valve plates 1 are immediately removed from the packing planes 13 by these forces.

Figure 4:
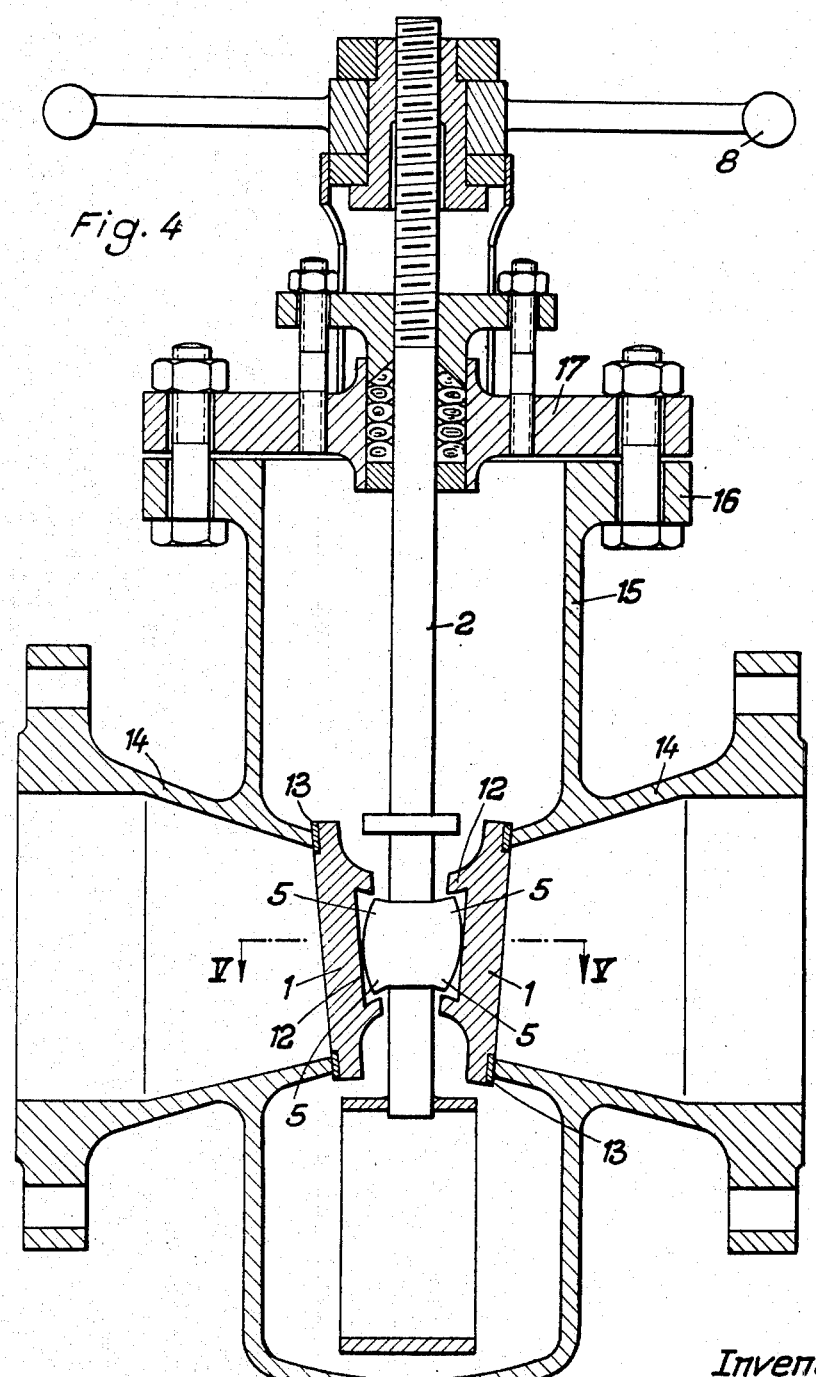
Fig. 4 shows a different embodiment in cross section.

As shown in Fig. 5 the diameter of the tubular stub 15 of the valve is so chosen with respect to the diameter of the valve plates 1 that the tubular stub 15 per se prevents the valve plates 1 from being moved laterally on guides 5, 12 with respect to the packing surfaces 13 beyond the permissible tolerance. While in view of the elimination of particular plate holders the invention provides a saving in materials and weight it is furthermore possible by this construction to decrease the dimensions of the valve. This decrease also has an effect on the necessary dimensions of the flanges 16 and the cover 17 (Fig. 4). In the valve housing guides 18 are provided for the valve plates 1 to relieve the stem 2 of lateral loads.

In Fig. 6 the connection between the valve stem 2 and the plates 1 or their intermediate pieces is illustrated schematically to an enlarged scale. From this it can particularly be seen that the enlargements 4 of the intermediate members 12 engage one another through projections and recesses so that the valve plates are given a limited possibility of movement by this type of connection. While in the embodiment in accordance with Fig. 6 the valve plates with the intermediate members 12 may in the assembly be pushed over the projections 5 of the enlargement 4 into their operating position from the top, Fig. 7 illustrates an embodiment of the invention where rails 19 are subsequently mounted upon projections 5 whereby the movement of the valve plates is limited.

In Fig. 8 an embodiment of the invention is schematically illustrated in which the connection between valve stem 2 and the intermediate member 12 is effected in such a manner that rails 20 are provided in the intermediate members 12 or upon the enlargement 4 which engage corresponding grooves 21. The grooves 21 are dimensioned in a manner as to afford the required tolerance for the valve plates.

In the embodiment according to Figs. 9-10 the dovetail guide means formed by intermediate members 12 and projections 5 is arcuated and the securing of the plates 1 or of the intermediate members 12 against excessively large lateral movements of the dove-tail guide is provided by special stops 22.

Fig. 11 illustrates an embodiment of the invention where the valve plates 1 engage a corresponding dove-tail guide in the enlargement 4 directly, so that special intermediate members are eliminated. This form of construction is particularly desirable in valves of large dimensions and for heavy duty.

In this and a similar manner a gate valve can be provided in accordance with the invention which is of particularly simple and nevertheless reliable construction. The elimination of special plate holders makes it also possible to substantially decrease the dimensions of the tubular stub and of the entire valve housing whereby the weight and the expenditure of material becomes substantially smaller. As mentioned hereinabove, it is particularly advantageous to weld the entire valve housing out of tube sections, in which connection the intake and output tubes may be made from tube sections rendered into conical shape by means of a mandrel.

The embodiments illustrated and described by no means exhaust the invention but the fundamental concepts may be varied as desired within the scope of the inventive concepts which is set forth in the appended claims.

I claim:

1. A gate valve comprising a pair of valve plates disposed in a housing, a valve stem including a section having direct engagement with and extending transversely of said plates and guiding rails defined in said housing having engagement with the peripheries of said plates, said stem section having a curved mid-portion in sliding engagement with the central areas of said plates and having upper and lower shoulder portions adjacent the ends of said curved mid-portion, and said plates having projections extending toward said stem section and defining recesses adapted to loosely engage said upper and lower shoulder portions.

2. A gate valve comprising a pair of valve plates disposed in a housing, a valve stem including a section having direct engagement with and extending transversely of said plates and guiding rails defined in said housing having engagement with the peripheries of said plates, said stem section having a curved mid-portion in sliding engagement with the central areas of said plates and having upper and lower shoulder portions adjacent the ends of said curved mid-portion, and said plates having projections extending toward said stem section and defining recesses adapted to loosely engage said upper and lower shoulder portions, said stem section constituting a pressure member engaging said recesses by means of said shoulders in the axial direction of said stem and by means of curved surfaces laterally of said stem.

3. A gate valve comprising a housing defining straight guiding edges along opposite sides thereof, a pair of valve plates disposed with diametrically opposite portions of their circumferences in direct engagement with said guiding edges and having shoulders defining recesses, and a valve stem extending transversely of said plates and having a curved section in engagement with the centers of said plates adapted to exert pressure laterally of said stem and upper and lower shoulders at the ends of said curved section adapted to engage said recesses to exert pressure on said plates in the directions axially of said stem.

FRIEDRICH HEINRICH STRADTMANN.

References Cited in the file of this patent

UNITED STATES PATENTS

| Number | Name | Date |
|---|---|---|
| 140,407 | Eddy | July 1, 1873 |
| 275,798 | Beaumont | Apr. 17, 1883 |
| 465,776 | Clynick | Dec. 22, 1891 |
| 685,438 | Warburton | Oct. 29, 1901 |
| 756,463 | Bosworth | Apr. 5, 1904 |
| 1,828,478 | Sparks | Oct. 20, 1931 |
| 2,198,639 | Stines | Apr. 30, 1940 |
| 2,287,435 | Koon | June 23, 1942 |

FOREIGN PATENTS

| Number | Country | Date |
|---|---|---|
| 59,367 | Holland | Mar. 16, 1947 |